June 23, 1953 H. E. CLUPHF 2,643,090
SHOCK ABSORBING CHECK VALVE FOR HYDRAULIC SYSTEMS
Filed Sept. 9, 1950

Inventor
HARLAN E. CLUPHF
By
Anderson & Muller
Attorneys

Patented June 23, 1953

2,643,090

UNITED STATES PATENT OFFICE 2,643,090

SHOCK ABSORBING CHECK VALVE FOR HYDRAULIC SYSTEMS

Harlan E. Cluphf, Denver, Colo., assignor to Harjeroy Engineered Petroleum Products Sales Co., Denver, Colo., a corporation of Colorado Application September 9, 1950, Serial No. 184,007

1 Claim. (Cl. 251—118)

This invention relates to valves for hydraulic systems and more particularly to check valves adapted to damp the effects of inertia of a moving body of liquid when the valve suddenly closes.

In certain types of oil wells it is common practice to employ so-called "bottom hole pumps," there being a number of modifications of same, but in general, all of which employ a reciprocating plunger, or its equivalent, and a pair of check valves which open and close as the plunger reciprocates. The check valves commonly employed comprise an annular valve seat and a metal ball valve adapted to seat thereon. These valves have certain disadvantages which will hereinafter become more apparent and which this invention obviates.

One of the objects of the invention is to provide an oil well check valve which incorporates a shock absorber device adapted to improve the general operation of an oil well pump.

Other objects are to improve the pump operation by reducing shock loads which occur at the ends of the pump plunger stroke, reduce shock waves, minimize valve seat scoring, reduce wear on the various parts of the pump, reduce stresses on the polish and sucker rods which reciprocate the plunger, increase pumping capacity, and reduce power requirements of the pump.

Still further objects, advantages, and salient features will become more apparent from a consideration of the description to follow, the appended claim, and the accompanying drawing, in which:

Figures 1, 2, 3, 4:
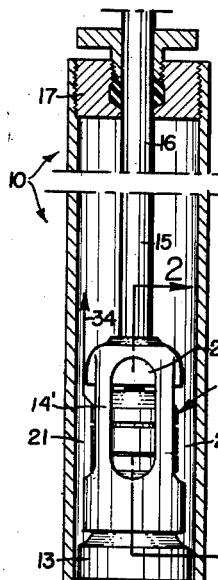
Figure 1 is a vertical section of an oil well pump to which the subject of the invention has been applied.
Figure 2 is an enlarged section taken on line 2—2, Figure 1.
Figure 3 is a section of an alternative form of the invention.
Figure 4 is a longitudinal section, similar to Figure 2, showing an alternative application of the invention.

Referring in detail to the drawing, and particularly Figure 1, the oil well pump 10 comprises, in general, a pump barrel 11, inlet valve assembly 12 secured thereto, a plunger 13 affixed to an outlet valve assembly 14, the latter being affixed to a sucker rod 15, the upper end of the latter being affixed to a "polish" rod 16 extending through stuffing box 17. The polish rod is operatively connected to a reciprocating member (not shown) adapted to reciprocate the plunger between predetermined limits in the barrel. The foregoing parts, except for the specific valve assemblies, are conventional and well-known in the art and the plunger is provided with any conventional packing such as cup washer 18, several of which are usually employed in tandem thereon.

Referring to Figure 2, which more clearly depicts the subject of the invention, valve assembly 14 comprises a generally cylindrical tubular cage 14' provided with an end wall 19 which is secured to sucker rod 15 by threads 20, the side wall being provided with a plurality of apertures 21. An annular valve seat 22 is secured to the cage by a circular flange 23 thereon, one side of which abuts shoulder 24 on the cage, and the other side abutting the upper threaded end 25 of plunger 13. The cage construction so far described is conventional in the prior art, the ball valve previously referred to also as prior art, engaging this valve seat.

In lieu of the prior art ball valve, this invention provides a novel valve device comprising a pair of identical head members 26, 26a having conical surfaces 27, 27a. As pointed out hereinafter only the lower one of said head members (members 26 in Figures 2 and 3) functions as a valve. The head members are provided with axial bores in which a pin or valve stem $p$ is slideably disposed, the pin being provided at its opposite ends with washers 28, 28a and snap rings 29, 29a which are disposed in grooves in the pin, the snap rings providing means for limiting movement of the head members away from each other. A spring 30 is disposed between the head members to urge the head members apart to the limit positions and a sleeve 31 is disposed between the head members to limit relative movement of the head members toward each other, this movement being indicated by distance $d$. The spring is preferably constructed so that when the head members have moved distance $d$ the spring is not completely collapsed. Each head member is provided with a suitable packing, such as O rings 32, 32a, to prevent leakage of liquid along pin $p$, these being optional and not necessarily required.

A frusto conical seat 22a is provided in wall 19 which limits upward movement of head member 26a, this seat being smaller in diameter than valve seat 22 so that the wear on the two head members occurs at different relative areas thereon. When head member 26 which functions as a valve becomes worn on the annular area indicated by 33 it is inverted in the cage which disposes an unworn area 33a on head member 26a in the position formerly occupied by the worn area. It will be apparent that this construction increases the usual life of the valves 26, 26a.

The valve construction of Figure 3 is the same as the previously described construction except that a resilient member 30', such as rubber, plastic or other resilient material is disposed between the valves, this serving the same purpose as spring 30.

Inlet valve assembly 12 is the same as outlet valve assembly 14, the only difference being that its lower end is fixedly secured in sealing engagement to barrel 11 rather than being reciprocable in the barrel.

In operation, and assuming that the plunger is moving downwardly, the inlet valve is closed and the outlet valve open, oil trapped in the barrel flows past the outlet valve as indicated by arrows 34. When the plunger reaches the lower end of its stroke the outlet valve closes and since there is now a large volume of oil above the plunger which must quickly be set in motion there will be high stresses on the sucker rod and other portions of the actuating mechanism. As the plunger starts to ascend, however, valve member 27a may move toward seated valve 27 against the urge of spring 30, this providing a cushion effect to reduce the high stresses and shock waves which occur near the lower end of the stroke. As the plunger moves upwardly the inlet valve is open, oil flows into the barrel, and the outlet valve is closed. When the plunger reaches the upper end of its stroke and starts down, the inlet valve closes and the outlet valve opens, the oil flowing in the barrel suddenly stopping which again tends to produce high stresses and shock waves in the system, these being cushioned by the movement of the member corresponding to 26a disposed in cage 12'.

It will now be apparent that high sucker and polish rod stresses which result due to shock loads at the ends of the plunger stroke may be reduced, thus minimizing rod breakage. Since the stresses in the rods are also a function of their velocity it follows that the number of strokes per minute may be increased due to reduction of stresses therein, thus increasing the pumping capacity of the well. The cushion effect of the valves also reduces the impact of same on their seats effecting reduction of pitting of the valves and seats, and wear on the various other parts of the system, which result from shock loads, will also be reduced.

In Figure 4 an alternative application of the invention is illustrated wherein the valve previously described is employed in a conduit 111, 111a in which the direction of fluid flow alternates from conduit 111, 111a to one or more conduits 40 as shown by arrows 41, 42. Cage 114' is similar to cage 14' except that it is provided with valve seats 122 and 122a at each end which provide communication with conduit 111, 111a on both sides of valve 126, 126a, flow passing through apertures 121 which are similar to apertures 21. The assembly is provided with members 112, 112a which sealingly engage, respectively, conduits 111, 111a. It will be apparent that when the valve is in the position shown flow is from conduit 111a, to conduits 40, there being no flow through conduit 111. When the flow in conduit 111a ceases and flow in conduit 111 commences the valve will shift and engage seat 122a, the flow then being from conduit 111 to conduits 40. This construction is of utility in certain types of mud pumps used for oil wells and will absorb the shock loads in the same manner as the construction employed with oil well pumps previously described. While valve seats 122, 122a have been illustrated as the same size, it will be apparent that one may be made smaller than the other as described for seats 22, 22a so that when the valve is reversed unworn portions thereof will engage the seats, thus providing the same seating as would result by replacement with a new valve, and hence prolonging the life of the valve.

Many modifications of the invention, and uses thereof, will become apparent to those skilled in the art, and the specific constructions and uses are therefore to be considered as exemplary only, and the invention not limited thereto except as defined within the scope of the appended claim.

Having described the invention, what I claim as new is:

A check valve assembly for use in hydraulic systems of the type subjected to shock when a check valve therein closes, comprising; upper and lower members having frustoconical seats thereon facing in opposite directions, a valve stem extending axially between the members, at least one of the members being slideable on the valve stem, means for limiting the relative movement of the members away from each other, means comprising an annular sleeve positioned between said members, the opening in said sleeve having an inwardly projecting flange positioned nearer the lower side than the upper, said duplicate members having each a cylindrical projection of a diameter substantially equal to the diameter of the opening in the sleeve, the distance from the lower surface of the sleeve to the under surface of the flange being less than the height of the cylindrical projections, and the corresponding distance above the flange being greater, resilient compressive means interposed between the members for urging them apart to the limit position, means comprising said sleeve for limiting relative movement of the members toward each other, and an apertured cage having a pair of axially spaced annular frusto-conical seats between which the assembly may reciprocate, one or the other of the members being automatically engageable, respectively, with one or the other of the annular seats, said cage and valve therein adapted to be bodily disposed as a unit within a liquid carrying conduit.

HARLAN E. CLUPHF.

References Cited in the file of this patent

UNITED STATES PATENTS

| Number | Name | Date |
|---|---|---|
| 1,839,029 | Horan | Dec. 29, 1931 |
| 1,885,338 | Estep | Nov. 1, 1932 |
| 2,117,056 | Dunn | May 10, 1938 |
| 2,152,084 | Paine | Mar. 28, 1939 |
| 2,329,960 | Verheul | Sept. 21, 1943 |
| 2,344,687 | Fischer | Mar. 21, 1944 |
| 2,354,255 | Gillum | July 25, 1944 |
| 2,417,242 | Eckel | Mar. 11, 1947 |

FOREIGN PATENTS

| Number | Country | Date |
|---|---|---|
| 21,225 | Great Britain | of 1914 |